(No Model.) 2 Sheets—Sheet 1.

E. LUND & J. KULLBERG.
PHOTOGRAPH HOLDER.

No. 532,571. Patented Jan. 15, 1895.

Witnesses:
Henry B. Avery.

Inventors:
Erick Lund,
John Kullberg.
By their attorneys.

THE NORRIS PETERS CO., PHOTO-LITHO., WASHINGTON, D. C.

(No Model.) 2 Sheets—Sheet 2.
E. LUND & J. KULLBERG.
PHOTOGRAPH HOLDER.
No. 532,571. Patented Jan. 15, 1895.
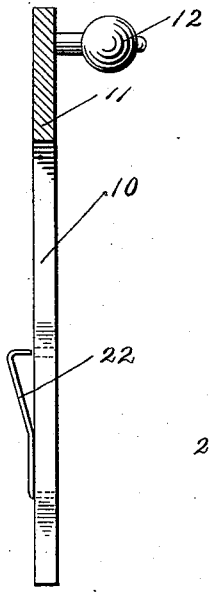
Fig. 6.
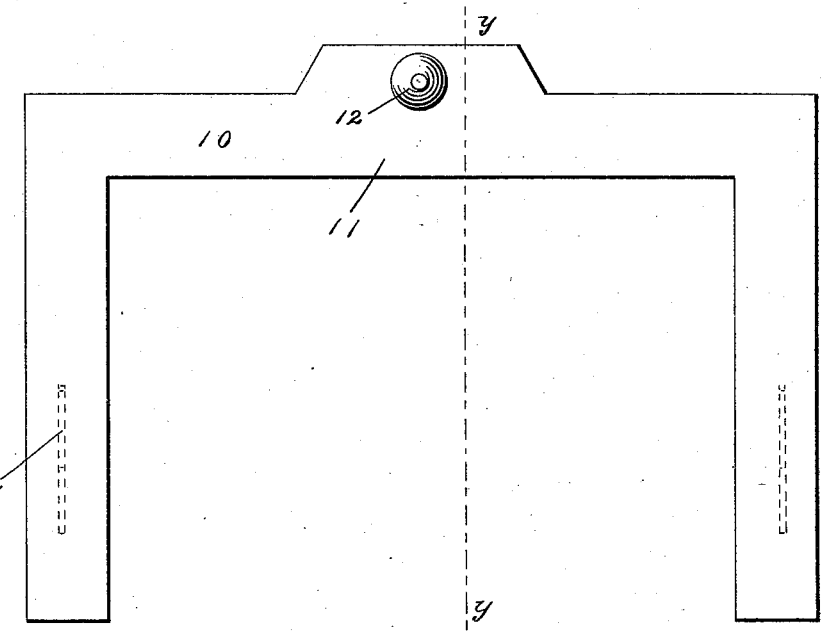
Fig. 5.
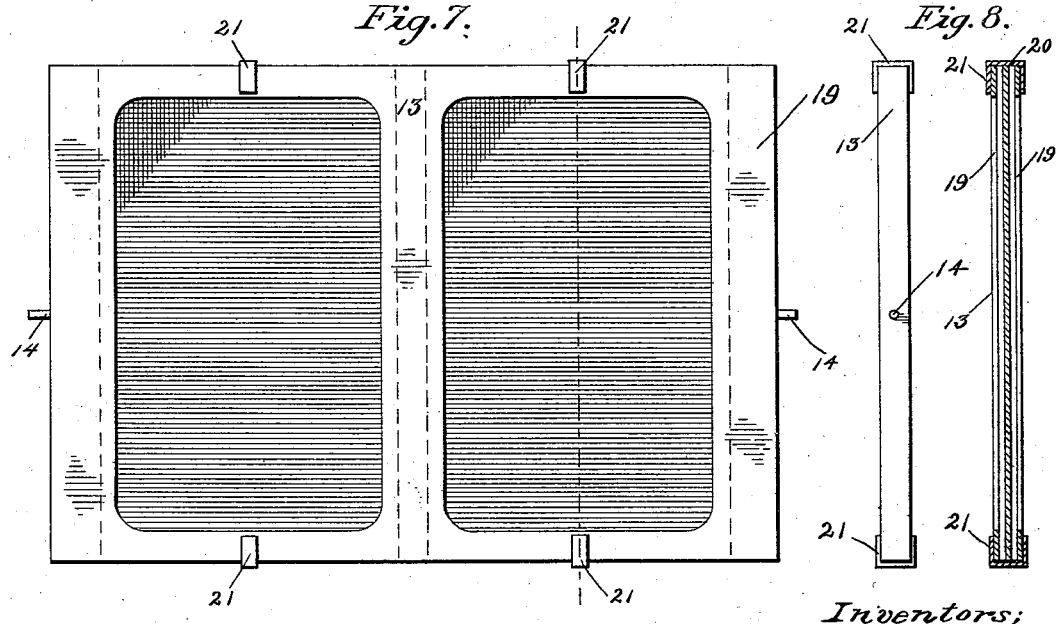
Witnesses;
Henry B. Avery.
Inventors;
Erick Lund,
John Kullberg.
By Paul O Hawley
their attorneys.

UNITED STATES PATENT OFFICE.

ERICK LUND AND JOHN KULLBERG, OF MINNEAPOLIS, MINNESOTA.

PHOTOGRAPH-HOLDER.

SPECIFICATION forming part of Letters Patent No. 532,571, dated January 15, 1895.

Application filed May 5, 1894. Serial No. 510,137. (No model.)

*To all whom it may concern:*

Be it known that we, ERICK LUND and JOHN KULLBERG, of the city of Minneapolis, county of Hennepin, State of Minnesota, have invented a certain new and Improved Photograph-Holder, of which the following is a specification.

Our invention relates to a device for holding a large number of photographs, and whereby one photograph or set of photographs may be withdrawn from before the glass-covered openings of the casing and another photograph or set presented.

The object of our invention is to provide a simple, cheap and neat device for presenting photographs one after another; the same being operated by the person viewing the photographs, pictures or advertisements, and to this end our invention consists in general in the combination, with a suitable box or casing, of curved guides or channels provided in the sides thereof, photograph leaves or frames provided with pins or studs upon their ends projecting into said grooves or guides, and a frame lifter for lifting the frames one by one from the lower part of the box and into the upper part thereof, whereby the frames are returned to the back of the box, and also reversed to expose pictures upon their opposite sides.

Our invention further consists in details of construction and in combinations all as hereinafter described and particularly pointed out in the claims.

The invention will be more readily understood by reference to the accompanying drawings, in which—

Figure 3:
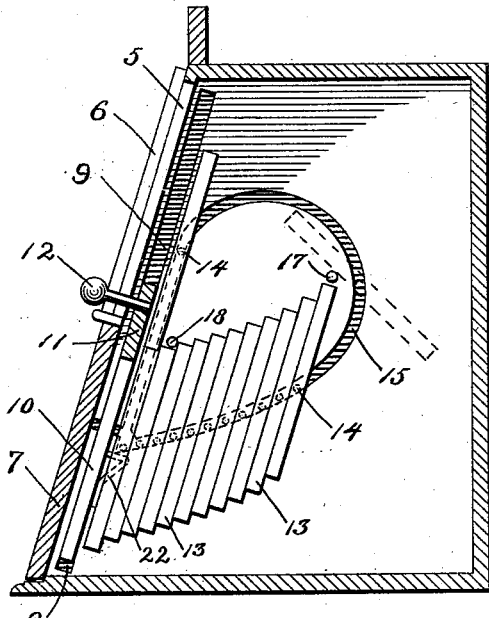
Figure 4:
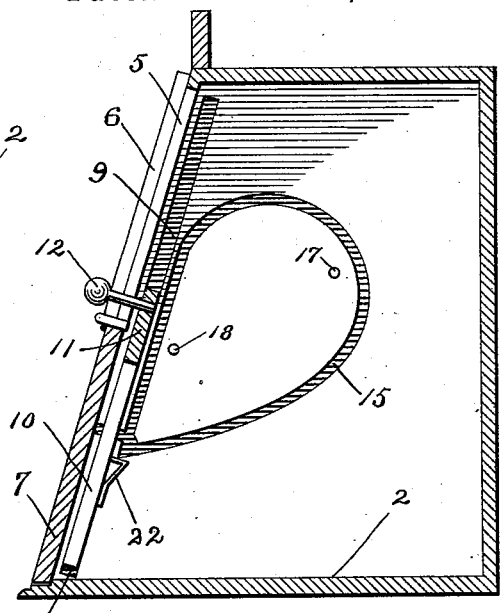
Figure 2:
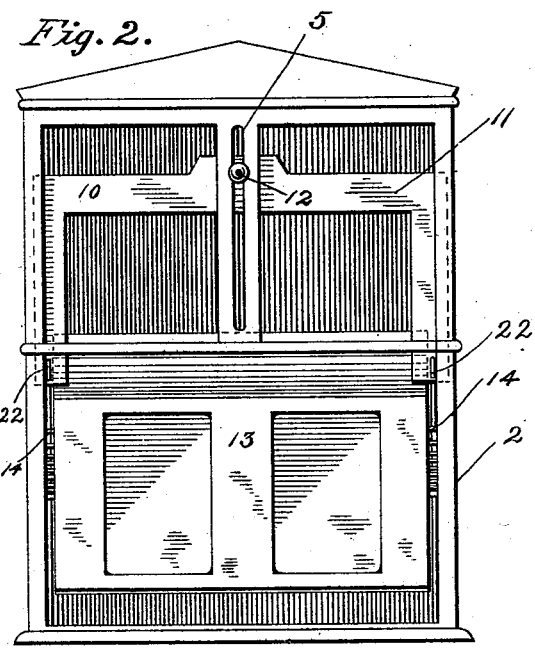
Figure 1:
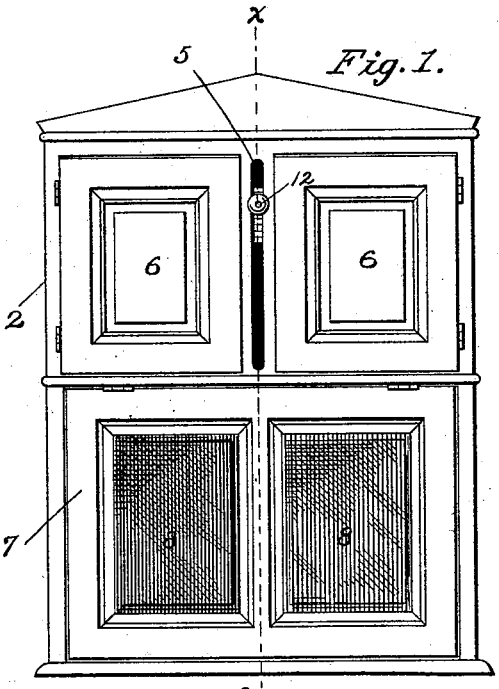

Figure 1 is a front elevation of the device embodying our invention. Fig. 2 is a similar front elevation thereof with the front or doors of the casing removed. Fig. 3 is a vertical section on the line $x$—$x$ of Fig. 1. Fig. 4 is a similar vertical section with the photograph frames or leaves removed. Fig. 5 is an enlarged view of the frame lifter. Fig. 6 is a sectional view thereof on the line $y$—$y$ of Fig. 5. Fig. 7 is an enlarged view of one of the picture frames or leaves. Fig. 8 is an end and sectional view thereof.

As shown in the drawings, 2 represents a suitable casing of a desired form or shape constructed in any suitable manner, and preferably having an inclined front form. In the front we preferably provide a frame, the upper part of the middle bar thereof having the vertical slot 5. The openings within this frame are closed by doors or lids 6 at the top and at the bottom by a door 7 having the glass panes 8. This door is preferably hinged at the top as shown, and when opened photographs may be either withdrawn or placed within the box through the lower opening. In the side walls of the casing and close to the front thereof, we provide the long slots or guides 9 for the frame lifter 10. This lifter is composed of the cross bar 11 and the depending parts, which parts or legs are held in the guide slots. The knob 12 extends from the cross-bar through the slot 5 in the front of the box to be grasped by the operator.

13 represents the picture-holding frames, which, as shown in Fig. 7, each have two end pins or studs 14 projecting into the opposite guide grooves 15, provided in the side walls of the casing. The front portions of these guide grooves are parallel with the front of the casing, the lower parts incline toward the front and the upper and rear portions are gradually curved to connect the front and inclined parts. The lower parts of the guide grooves project downward to about the middle of the openings in the lower door, and the pins or studs are placed midway in the ends of the frame. Pins 17 are preferably provided in the sides of the casing at points just above the top of the last frame and close to the rear curve of the guides, these pins serving to momentarily hold the tops of the frames as they slide down the slot and thus compel the lower ends of the same to swing forward. Similar pins 18 are preferably provided over the ends of the front frame to prevent more than one frame being caught by the frame lifter or the friction of one frame upon the other, resulting in damage to the device.

The frames may be of any desired construction, but we prefer that shown in Figs. 7 and 8, where it will be seen that two similar frames 19 are placed back to back with a small space 20 between them, into each side of which two photographs may be slipped back to back. The photographs are obviously arranged in opposite positions as the frame is inverted or reversed at each revolution in the guides. Small spring snaps or other latches 21 may be provided to prevent the photographs from slipping out of the frame. The frames should be as thin as possible in order that a large number of them may be placed in a small case. Inasmuch as the frames must turn and swing downwardly in the back of the box, it is necessary to leave a space between the rear edges of the curve and the back of the casing, which space will be at least as large as half the width of one of the picture frames or holders.

The operation of the device is as follows: The frame lifter straddles the frames as they reach the bottom so that the frames may project close to the glass front and be in no way concealed by the frame lifter. The opposite depending parts of the frame lifter are provided with small spring shoulders or snaps 22, which, when the frame is down, extend beneath the pins of the lower frame. Hence, when the frame is lifted by means of the knob these spring parts or hooks engage the pins and a frame is carried upward thereby. As the frame reaches its upper position another frame will slip forward under the first frame which will thus be supported in its raised position. The frame lifter may then be pushed down, and the snaps will recede to pass the pins of the second frame. Upon raising the second frame in a similar manner the upper edge thereof will engage with the lower edge of the first frame, the result being that the latter is moved backward in the guide grooves and descending quickly in the downwardly inclined rear part thereof will topple or tilt over the pins 17 and the top of the last frame of the group. This tilting reverses the picture frame and consequently the pictures upon its opposite side will be presented when the frame next arrives before the opening in the casing. The weight of the frames in the back acts to force forward the front frames and as the pairs of studs move freely in the guides the lifting of the frames or holders may be rapidly repeated if it is desired to bring a particular photograph to the front quickly.

It is obvious that the particular construction which we have shown and described may be altered to a considerable extent without departing from the spirit of our invention, and we therefore do not confine ourselves to the specific details of construction shown and described.

Having thus described our invention, we claim as new and desire to secure by Letters Patent—

1. The combination, in a photograph holder, of the box or casing, provided with the openings in its front, with the series of photograph holders or frames, guides therefor in the sides of said box, the lower parts of said guides being inclined downwardly and toward the front of the box or casing and a frame lifter guided in the front of the casing, and means for operating said lifter from the outside of the casing whereby the frames may be lifted one by one and moved into the back of the casing, substantially as described.

2. The combination, in a photograph holder, of the box or casing, provided with the inclined front having openings in its lower part, with the frame lifter, having its depending side parts held in guides in said casing, a knob extending from said frame lifter to the outside of the casing, the guide grooves provided in the sides of the casing, the photograph frames having studs projecting into said groves, the forward parts of said grooves being substantially parallel with the front of the casing, the lower parts being inclined toward the front of the casing, and the rear and upper part of said grooves being curved, substantially as described.

3. The combination, in a photograph holder, of the box or casing provided with the inclined front, having openings in its lower part, with the frame lifter having its depending side parts held in the vertical guides in said casing and adapted to move therein; a knob extending from said frame lifter, the guide grooves provided in the sides of the casing, the photograph frames having studs projecting into said grooves, the forward parts of said grooves being substantially parallel with the front of the casing, the lower parts being inclined toward the front and bottom of the casing, and the rear and upper part of said grooves being curved, said frame lifter being provided with snap latches or hooks 22, adapted, when the lifter is raised to engage the first frame, and limiting pins 17 and 18 in the sides of the casing, substantially as described.

In testimony whereof we have hereunto set our hands this 28th day of March, A. D. 1894.

ERICK LUND.
JOHN KULLBERG.

In presence of—
A. C. PAUL,
F. S. LYON.